March 31, 1931.  J. H. DOORBAR  1,798,870

METHOD FOR PROTECTING FILM

Filed June 23, 1927

J. H. Doorbar  Inventor

By his attorney

Harold A. Kingsbury

Patented Mar. 31, 1931

1,798,870

UNITED STATES PATENT OFFICE

JOHN H. DOORBAR, OF HIGHLAND PARK, NEW JERSEY, ASSIGNOR TO DU PONT-PATHÉ FILM MANUFACTURING CORPORATION, OF WILMINGTON, DELAWARE, A CORPORATION OF DELAWARE

METHOD FOR PROTECTING FILM

Application filed June 23, 1927. Serial No. 200,876.

This invention is in the motion picture art and has particular relation to a method of loading and unloading film in the camera, the invention being particularly directed to the avoidance of edge fog.

With cameras using daylight loading spools, and adapted particularly for use by amateurs, there is considerable danger of edge fog, there being several reasons for this. By the present method and spool this danger is substantially eliminated as will be evident from the following description thereof. While not restricting the invention thereto, particular reference is made, for convenience of description, to the device illustrated in the accompanying drawings.

Figure 1:
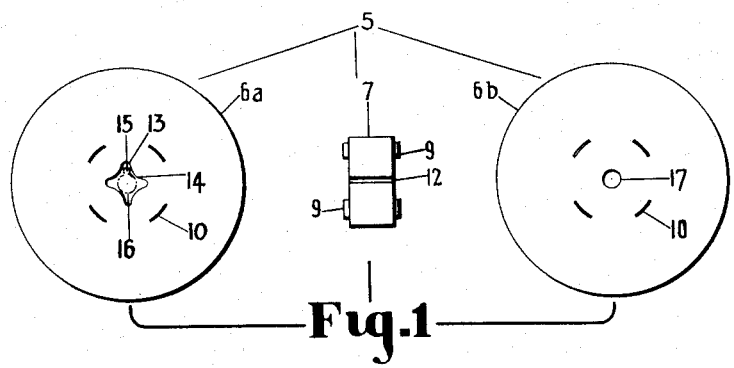
Figure 2:
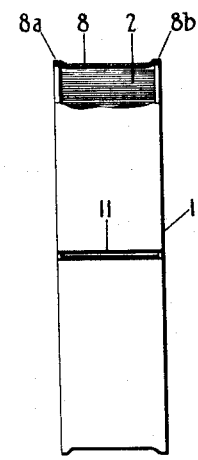
Figure 5:
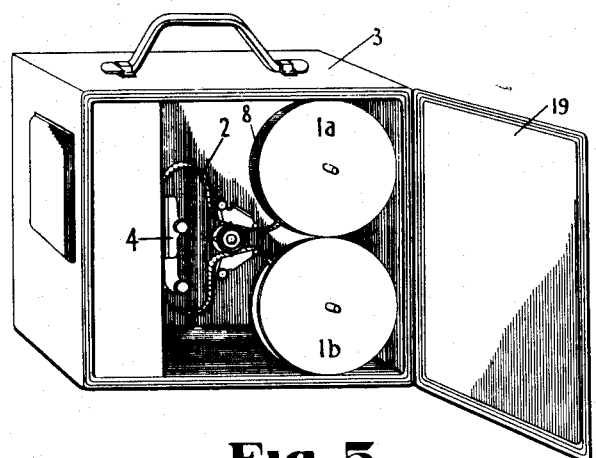
Figure 3:
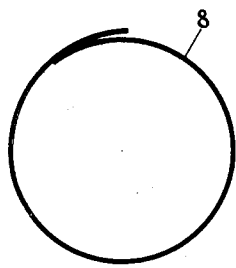
Figure 4:
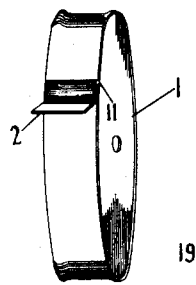
Figure 6:
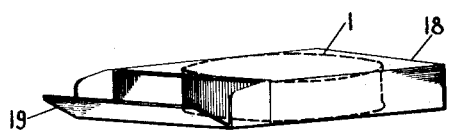

In these drawings, Figure 1 is a collective view of the spool parts before assembly; Figure 2 is an elevational edge view of the spool and carried film, partially broken away; Figure 3 is an elevational view of the covering strip of the spool; Figure 4 is a perspective view of the spool and its covering strip assembled ready for shipment and introduction into the camera; Figure 5 is a simplified perspective view of a motion picture camera with a pair of spools, in accordance with the present invention, mounted therein, the upper or delivery spool having its covering strip thereon; and Figure 6 is a perspective view of a container which may be used for the spool, the spool being indicated by dotted lines.

Referring now to the drawings, the illustrated spool, designated generally as 1, and carrying a film 2 wound thereon, is adapted for mounting in a camera 3, either as a delivery spool $1^a$ or wind-up spool $1^b$ (Fig. 5), the film 2 being threaded from the spool $1^a$ through the gate 4, and related mechanism, to the spool $1^b$, as will be understood by those skilled in the art.

The spool 1 comprises the spool proper 5 preferably of metal, composed of the side flanges $6^a$, $6^b$, and hollow hub 7, and also comprises the light seal or cover 8. The parts $6^a$, $6^b$, and 7 are designed for permanent assembly together, as by passing the lugs 9 on the hub through corresponding slots 10 in the flanges, and upsetting the lugs. The light seal or cover 8 is preferably in the character of a thin band of resilient metal, say brass or steel, given a permanent set or bias towards coiling, as indicated in Figure 3, is of slightly less length than the peripheral length of the spool flanges, and is shaped at its edges to fit upon the edges of the spool flanges $6^a$, $6^b$, as indicated at $8^a$, $8^b$, and has its body of somewhat less diameter than the flanges, thereby to prevent side slip of the light seal. The seal is sufficiently shorter than the peripheral length of the spool flanges to provide an exit slit 11 for the film 1.

In assembling the spool and film, one end of the film is passed through the holding slot 12 in the hub, 7, the film is wound upon the spool, the light seal 8 is sprung about the spool, and the outer end of the film is brought through the slit 11, or, if preferred, the film may be left entirely within the chamber formed by the spool 5 and the light seal 8, and the user himself may bring the end of the film through the slit 11. The film is, of course, ordinarily provided at each end with lead strips, not specifically shown, but it will be understood I use the term "film" to designate the entire strip of material, meaning thereby to include lead strips, where used, whether made of the same material as the film proper or of different pieces of material attached to the film proper.

As indicated in Figure 1, one of the edge flanges of the spool is provided with an aperture providing a plurality of key slots 13, and bearing surfaces 14, the key slots being adapted for reception of a key, as 15, on the shaft 16 of the camera, as shown in phantom in Figure 1. The other edge flange, as $6^b$, is provided with a bearing aperture 17 for the shaft 16. It will be understood, of course, that any other arrangements, for mounting the spool on the spindle as desired, may be used without departing from the spirit of the invention.

For shipment of the spool to the user it is conveniently housed in a container such as a metal or pasteboard box of any desired shape. A simple form of cardboard box 18 with the usual flap 19 is illustrated in Figure 6, the spool 1 being shown therein.

In carrying out the method of the present invention in the preferable manner, with the use of the described spool, the container 18 with the spool 1 therein is brought to the camera, and the spool removed from the container and placed upon the delivery spindle of the camera. The end of the film, projecting through the slit 11 provided by the spaced ends of the strip 8, is threaded through the gate 4, etc., and connected with the hub of the wind-up spool. The strip 8 is now removed from the delivery spool and the door 19 of the camera immediately closed. (It will be understood the door is provided with means, not shown, for holding the spools upon the spindles, as is usual.) When the film has been exposed and fully wound through the camera, and wound upon the wind-up spool, the door 19 is opened, a strip 8 at once placed about the wind-up spool, it being understood that the wind-up spool is constructed in accordance with the present invention, and the spool removed from the camera and placed in a container, as 18. While mention of a container, such as 18, has been made, it will be understood that the use of such a container is not essential to the present method, since the light seal 8, in itself, and without additional protecting means provides a highly satisfactory light seal.

I claim:

1. The method of protecting a strip of film from light which comprises transportation of such film to the camera on a spool comprising a flanged spool proper and a light seal about the spool proper in the character of a removable peripheral band carried by the flanges of the spool proper and forming with the flanges a chamber for the film, placing the spool in the camera, removing the light seal, and closing the camera.

2. The method of protecting a strip of film from light which comprises transportation of such film to the camera on a spool comprising a flanged spool proper and a light seal about the spool proper in the character of a removable peripheral band carried by the flanges of the spool proper and forming with the flanges a chamber for the film, and having an aperture for the projection of the end of the film therethrough, placing the spool in the camera, threading the film through the camera, removing the light seal, and at once closing the camera.

3. The method of protecting a strip of film from light which comprises transportation of such film to the camera in a light-tight container and on a spool comprising a flanged spool proper and a light seal about the spool proper in the character of a removable peripheral band carried by the flanges of the spool proper and forming with the flanges a chamber for the film, removing the spool from the container, placing the spool in the camera, removing the light seal, and at once closing the camera.

4. The method of protecting a strip of film from light which comprises transportation of such film to the camera on a spool comprising a flanged spool proper and a light seal about the spool proper in the character of a removable peripheral band carried by the flanges of the spool proper and forming with the flanges a chamber for the film, placing the spool in the camera, threading the film through the camera and attaching its end to the spool proper of a similar spool serving as a wind-up spool, removing the light seal on the first-named spool, closing the camera, operating the camera to wind the film completely through the camera and onto the second-named spool, opening the camera and at once applying the light seal of the second-named spool thereto, and removing such spool from the camera.

In testimony whereof I affix my signature.

JOHN H. DOORBAR.